US010946854B2

(12) United States Patent
Nawata

(10) Patent No.: US 10,946,854 B2
(45) Date of Patent: Mar. 16, 2021

(54) CONTROL DEVICE OF HYBRID VEHICLE

(71) Applicant: TOYOTA JIDOSHA KABUSHIKI KAISHA, Aichi-ken (JP)

(72) Inventor: Hidekazu Nawata, Gotemba (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 186 days.

(21) Appl. No.: 16/260,009

(22) Filed: Jan. 28, 2019

(65) Prior Publication Data
US 2019/0232948 A1     Aug. 1, 2019

(30) Foreign Application Priority Data

Jan. 29, 2018   (JP) ............................. JP2018-012724

(51) Int. Cl.
| | |
|---|---|
| *B60W 20/14* | (2016.01) |
| *B60W 20/11* | (2016.01) |
| *B60W 20/16* | (2016.01) |
| *F01N 3/20* | (2006.01) |

(52) U.S. Cl.
CPC ............ *B60W 20/14* (2016.01); *B60W 20/11* (2016.01); *B60W 20/16* (2016.01); *F01N 3/2013* (2013.01)

(58) Field of Classification Search
CPC combination set(s) only.
See application file for complete search history.

(56) References Cited

U.S. PATENT DOCUMENTS

| | | | |
|---|---|---|---|
| 2006/0086546 A1* | 4/2006 | Hu ............................. | F01N 3/08 180/65.25 |
| 2011/0125351 A1* | 5/2011 | Bauerle .................... | B60L 50/53 701/22 |
| 2012/0173062 A1* | 7/2012 | Madurai Kumar ... | B60W 10/26 701/22 |
| 2012/0304622 A1* | 12/2012 | Verbrugge ............ | B60W 10/30 60/274 |
| 2014/0000245 A1* | 1/2014 | Harada .................. | F01N 3/2026 60/286 |
| 2014/0210262 A1* | 7/2014 | Yaegaki .................. | B60L 58/20 307/10.1 |
| 2016/0152226 A1* | 6/2016 | Lee ........................ | B60W 10/08 701/22 |

FOREIGN PATENT DOCUMENTS

JP            2015-33911 A     2/2015

\* cited by examiner

*Primary Examiner* — Christian Chace
*Assistant Examiner* — Amelia Vorce
(74) *Attorney, Agent, or Firm* — Hauptman Ham, LLP

(57) ABSTRACT

A control device of a hybrid vehicle includes a power consumption calculating part configured to calculate power able to be consumed in the electric heating type catalyst, and a power supply control part configured to select a route for supplying the regenerative power to the electric heating type catalyst and supply the regenerative power to the electric heating type catalyst. The power supply control part is configured to supply the regenerative power to the electric heating type catalyst without going through the battery if the power able to be consumed in the electric heating type catalyst is equal to or more than a predetermined value, and supply the regenerative power to the electric heating type catalyst through the battery if the power able to be consumed in the electric heating type catalyst is less than the predetermined value.

3 Claims, 6 Drawing Sheets

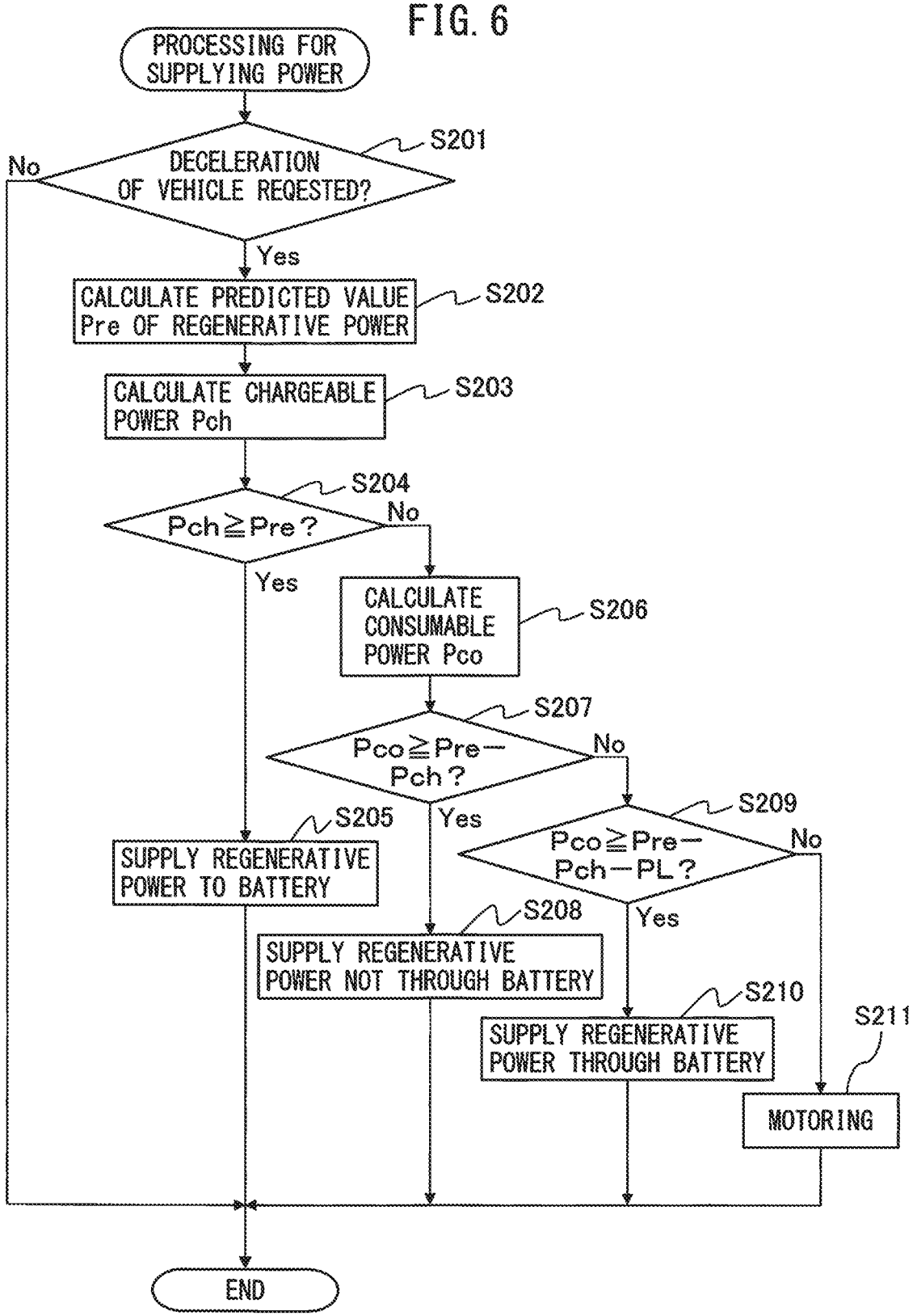

CONTROL DEVICE OF HYBRID VEHICLE

RELATED APPLICATIONS

The present application claims priority of Japanese Application Number 2018-012724, filed on Jan. 29, 2018, the disclosure of which is hereby incorporated by reference herein in its entirety.

FIELD

The present invention relates to a control device of a hybrid vehicle.

BACKGROUND

Known in the art has been a hybrid vehicle provided with an internal combustion engine and motor-generator as sources of power for driving use. In an exhaust passage of the internal combustion engine, a catalyst is provided for removing the harmful substances in exhaust gas. However, if during driving of the hybrid vehicle the time during which the internal combustion engine is stopped becomes long, the temperature of the catalyst will become less than the activation temperature and the exhaust purification performance of the catalyst will fall.

For this reason, in the hybrid vehicle described in PTL 1, an electric heating type catalyst is provided in the exhaust passage of the internal combustion engine. The electric heating type catalyst is supplied with power so that the temperature of the electric heating type catalyst is maintained in a predetermined range. Specifically, when regenerative power is generated by the motor-generator, if the amount of charge of the battery is larger than a threshold value, regenerative power which cannot be charged in the battery is supplied to the electric heating type catalyst so that the temperature of the electric heating type catalyst is maintained in the predetermined range.

CITATION LIST

Patent Literature

[PTL 1] Japanese Unexamined Patent Publication No. 2015-033911

SUMMARY

Technical Problem

However, if the regenerative power causes the temperature of the electric type heating catalyst to exceed a heat resistance temperature, the electric type heating catalyst is liable to melt down and the exhaust purification performance of the electric type heating catalyst is liable to fall. For this reason, in the electric heating type catalyst, there is a "consumable power" up to which the temperature of the electric heating type catalyst does not exceed the heat resistance temperature.

If at the time of regeneration the temperature of the electric heating type catalyst is already high, to suppress excessive temperature rise of the electric heating type catalyst and fall of the braking ability of the vehicle, it may be considered to perform "motoring" using the output torque of the motor-generator to drive the internal combustion engine. By doing this, it is possible to cause engine braking while consuming regenerative power unable to be charged in the battery. However, if motoring is performed and the internal combustion engine is driven at a timing unforeseen by the driver, the driver is liable to feel strange.

Therefore, considering the above technical problem, an object of the present invention is to provide a control device of a hybrid vehicle able to suppress motoring at the time of regeneration.

Solution to Problem

The summary of the present disclosure is as follows.

(1) A control device of a hybrid vehicle for controlling a hybrid vehicle comprising an internal combustion engine in an exhaust passage of which an electric heating type catalyst is provided, a motor-generator, and a battery storing regenerative power generated by the motor-generator, comprising: a power consumption calculating part configured to calculate power able to be consumed in the electric heating type catalyst; and a power supply control part configured to select a route for supplying the regenerative power to the electric heating type catalyst and supply the regenerative power to the electric heating type catalyst, wherein the power supply control part is configured to supply the regenerative power to the electric heating type catalyst without going through the battery if the power able to be consumed in the electric heating type catalyst is equal to or more than a predetermined value, and supply the regenerative power to the electric heating type catalyst through the battery if the power able to be consumed in the electric heating type catalyst is less than the predetermined value.

(2) The control device of a hybrid vehicle described in above (1), further comprising: a regenerative power calculating part configured to calculate a predicted value of regenerative power generated by the motor-generator when deceleration of the hybrid vehicle is requested; and a charged power calculating part configured to calculate power able to be charged in the battery, wherein if the predicted value is larger than the power able to be charged in the battery, the power supply control part is configured to supply the regenerative power to the electric heating type catalyst without going through the battery if the power able to be consumed in the electric heating type catalyst is equal to or more than the predicted value minus the power able to be charged in the battery, and supply the regenerative power to the electric heating type catalyst through the battery if the power able to be consumed in the electric heating type catalyst is less than the predicted value minus the power able to be charged in the battery.

(3) The control device of a hybrid vehicle described in above (2), wherein if the power able to be consumed in the electric heating type catalyst is less than the predicted value minus the power able to be charged in the battery, the power supply control part is configured to supply the regenerative power to the electric heating type catalyst through the battery if the power able to be consumed in the electric heating type catalyst is equal to or more than the predicted value minus the power able to be charged in the battery and power loss when the regenerative power is passed through the battery, and use the regenerative power to drive the internal combustion engine without supplying the regenerative power to the electric heating type catalyst if the power able to be consumed in the electric heating type catalyst is less than the predicted value minus the power able to be charged in the battery and the power loss.

Advantageous Effects of Invention

According to the present invention, there is provided a control device of a hybrid vehicle able to suppress motoring at the time of regeneration.

BRIEF DESCRIPTION OF DRAWINGS

FIG. 6 is a flow chart showing a control routine of processing for supplying power in the second embodiment of the present invention.

DESCRIPTION OF EMBODIMENTS

Figure 1:
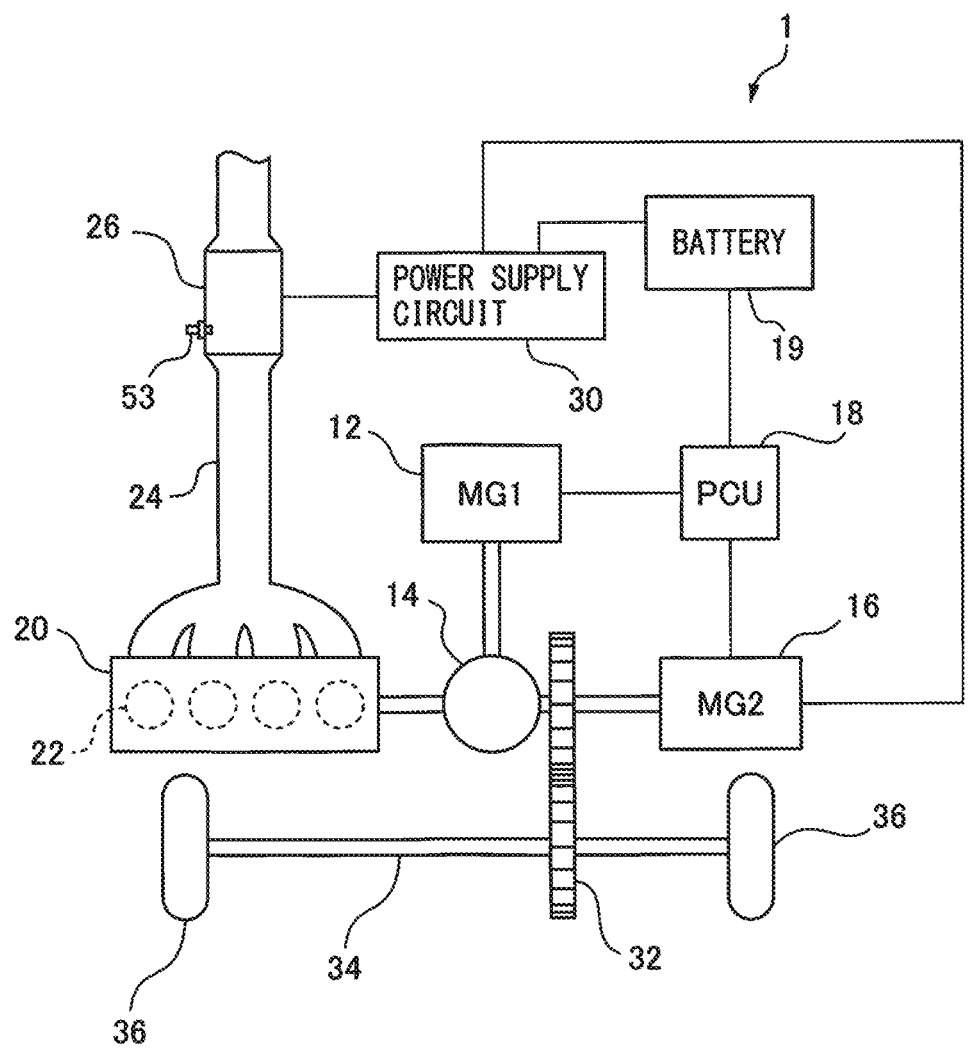
FIG. 1 is a view schematically showing the configuration of a hybrid vehicle according to a first embodiment of the present invention.

Below, referring to the drawings, embodiments of the present invention will be explained in detail. Note that, in the following explanation, similar components are assigned the same reference signs.

First Embodiment

Below, referring to FIG. 1 to FIG. 3, a first embodiment of the present invention will be explained.
<Configuration of Hybrid Vehicle>
FIG. 1 is a view schematically showing the configuration of a hybrid vehicle 1 according to the first embodiment of the present invention. A hybrid vehicle 1 is provided with an internal combustion engine 20, first motor-generator 12, power distributing mechanism 14, second motor-generator 16, power control unit (PCU) 18, and battery 19.

The internal combustion engine 20 burns an air-fuel mixture of fuel and air in cylinders 22 to output power. The internal combustion engine 20, for example, is a gasoline engine or diesel engine. An output shaft of the internal combustion engine 20 (crankshaft) is mechanically connected to the power distributing mechanism 14, and output of the internal combustion engine 20 is input to the power distributing mechanism 14.

The first motor-generator 12 functions as a generator and motor. The first motor-generator 12 is mechanically connected to the power distributing mechanism 14, and the output of the first motor-generator 12 is input to the power distributing mechanism 14. Further, the first motor-generator 12 is electrically connected to the PCU 18. When the first motor-generator 12 functions as a generator, the electric power generated by the first motor-generator 12 is supplied through the PCU 18 to at least one of the second motor-generator 16 and battery 19. On the other hand, when the first motor-generator 12 functions as a motor, the electric power stored in the battery 19 is supplied through the PCU 18 to the first motor-generator 12.

The power distributing mechanism 14 is configured as a known planetary gear mechanism including a sun gear, ring gear, pinion gears, and a planetary carrier. The output shaft of the internal combustion engine 20 is coupled with the planetary carrier, the first motor-generator 12 is coupled with the sun gear, and a speed reducer 32 is coupled with the ring gear. The power distributing mechanism 14 distributes the output of the internal combustion engine 20 to the first motor-generator 12 and the speed reducer 32.

Specifically, when the first motor-generator 12 functions as a generator, the output of the internal combustion engine 20 input to the planetary carrier is distributed to the sun gear coupled with the first motor-generator 12 and the ring gear coupled with the speed reducer 32 in accordance with the gear ratio. The output of the internal combustion engine 20 distributed to the first motor-generator 12 is used to generate electric power by the first motor-generator 12. On the other hand, the output of the internal combustion engine 20 distributed to the speed reducer 32 is transmitted as power for driving use through an axle 34 to the wheels 36. Therefore, the internal combustion engine 20 can output power for driving use. Further, when the first motor-generator 12 functions as a motor, the output of the first motor-generator 12 is supplied through the sun gear and planetary carrier to the output shaft of the internal combustion engine 20 whereby the internal combustion engine 20 is cranked.

The second motor-generator 16 functions as a generator and motor. The second motor-generator 16 is mechanically connected to the speed reducer 32, and the output of the second motor-generator 16 is supplied to the speed reducer 32. The output of the second motor-generator 16 supplied to the speed reducer 32 is transmitted as power for driving use to the wheels 36 through the axle 34. Therefore, the second motor-generator 16 can output power for driving use.

Further, the second motor-generator 16 is electrically connected to the PCU 18. At the time of deceleration of the hybrid vehicle 1, due to rotation of the wheels 36, the second motor-generator 16 is driven and the second motor-generator 16 functions as a generator. As a result, so-called regeneration is performed. When the second motor-generator 16 functions as a generator, the regenerative power generated by the second motor-generator 16 is supplied through the PCU 18 to the battery 19. On the other hand, when the second motor-generator 16 functions as a motor, the power stored in the battery 19 is supplied through the PCU 18 to the second motor-generator 16.

The PCU 18 is electrically connected to the first motor-generator 12, second motor-generator 16, and battery 19. The PCU 18 includes an inverter, booster converter, and DC-DC converter. The inverter converts the DC power supplied from the battery 19 to AC power and converts the AC power generated by the first motor-generator 12 or second motor-generator 16 to DC power. The booster converter boosts the voltage of the battery 19 in accordance with need when power stored in the battery 19 is supplied to the first motor-generator 12 or second motor-generator 16. The DC-DC converter lowers the voltage of the battery 19 when power which had been stored in the battery 19 is supplied to other electronic equipment such as headlights.

The battery 19 stores power generated by the first motor-generator 12 using the output of the internal combustion engine 20, and regenerative power generated by the second motor-generator 16 using the regenerative energy. The battery 19 is, for example, a lithium ion battery, nickel-hydrogen battery, or other secondary battery.

The exhaust gas discharged from the cylinders 22 of the internal combustion engine 20 passes through the exhaust passage 24 and is discharged into the atmosphere. In the exhaust passage 24, an electric heating type catalyst (EHC)

26 is provided. The EHC 26 includes an oxidation catalyst, three-way catalyst, $NO_X$ storage and reduction type catalyst (NSR catalyst), selective reduction type $NO_X$ reducing catalyst (SCR catalyst), etc., and removes the harmful substances in the exhaust gas. The EHC 26 includes a heating element generating heat when energized. If the EHC 26 is supplied with power, the heating element generates heat and the temperature of the EHC 26 rises. Note that, as the EHC 26, various known EHCs can be used.

In the present embodiment, when heating of the EHC 26 is requested, power stored in the battery 19 or regenerative power generated by the second motor-generator 16 is supplied to the EHC 26 through the power supply circuit 30. The power supply circuit 30 is electrically connected to the EHC 26, battery 19, and second motor-generator 16. The power supply circuit 30 includes an inverter and booster converter. The inverter converts AC power generated by the second motor-generator 16 to DC power when power is supplied from the second motor-generator 16 directly to the EHC 26. The booster converter boosts the voltage of the battery 19 when the power stored in the battery 19 is supplied to the EHC 26.

<Control Device of Hybrid Vehicle>

Figure 2:
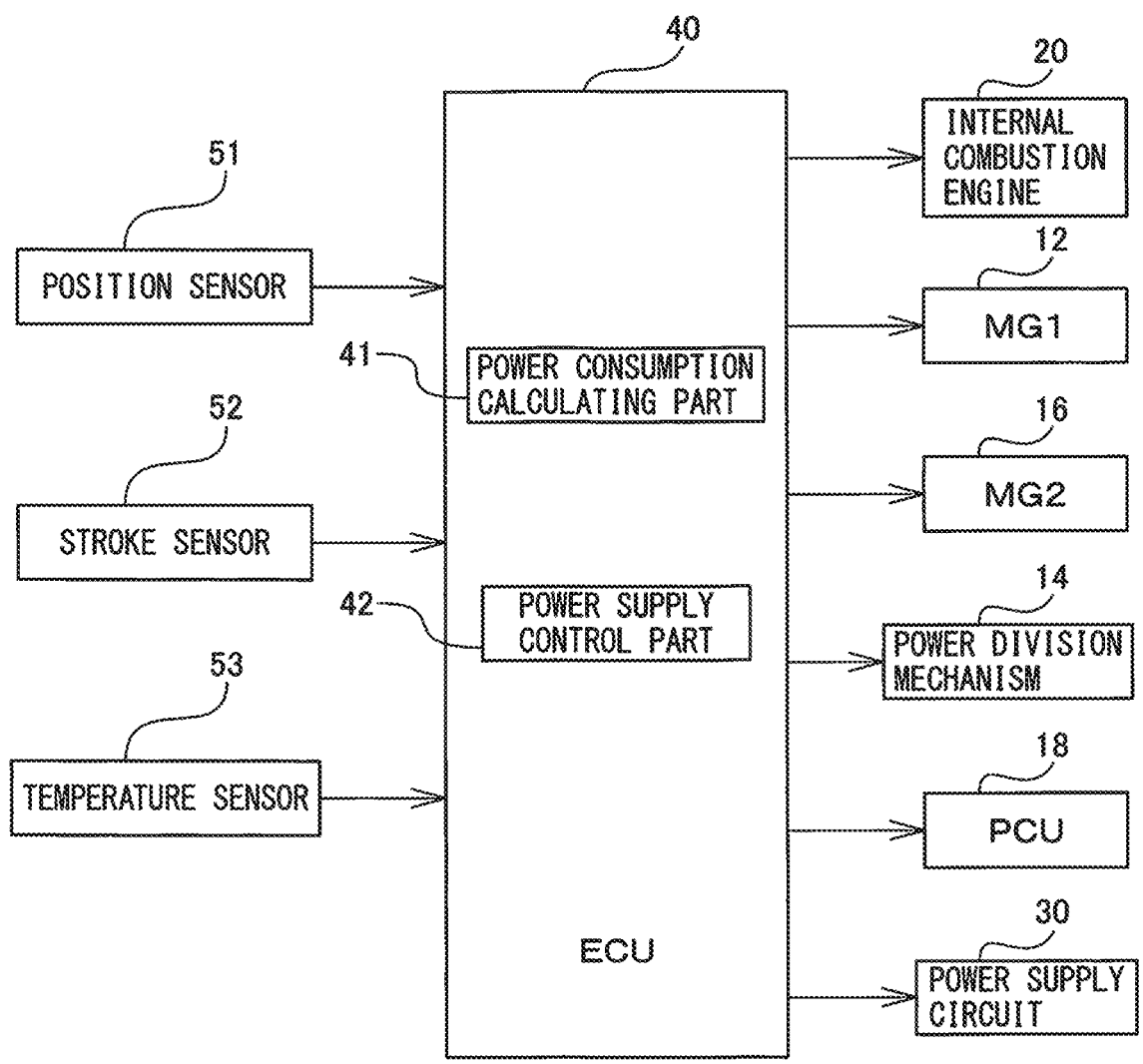
FIG. 2 is a block diagram schematically showing the configuration of a control device of a hybrid vehicle etc., according to the first embodiment of the present invention.

FIG. 2 is a block diagram schematically showing the configuration of a control device of a hybrid vehicle etc., according to a first embodiment of the present invention. The hybrid vehicle 1 is provided with an electronic control unit (ECU) 40. The ECU 40 is an electronic control device controlling the hybrid vehicle 1. The ECU 40 is provided with a memory such as a read only memory (ROM) and random access memory (RAM), a central processing unit (CPU), an input port, an output port, a communication module, etc. In the present embodiment, a single ECU 40 is provided, but a plurality of ECUs may be provided for the individual functions. In the present embodiment, the ECU 40 functions as a power consumption calculating part 41 and power supply control part 42.

The outputs of various sensors provided at the hybrid vehicle 1 are input to ECU40. In the present embodiment, the outputs of the position sensor 51, stroke sensor 52, and temperature sensor 53 are input to the ECU 40.

The position sensor 51 detects the amount of operation of the accelerator pedal provided at the hybrid vehicle 1. The position sensor 51 is connected to the ECU 40. The output of the position sensor 51 is sent to the ECU 40.

The stroke sensor 52 detects the amount of operation of a brake pedal provided at the hybrid vehicle 1. The stroke sensor 52 is connected to the ECU 40. The output of the stroke sensor 52 is sent to the ECU 40.

The temperature sensor 53, as shown in FIG. 1, is provided at the EHC 26 and detects the temperature of the EHC 26. The temperature sensor 53 is connected to the ECU 40. The output of the temperature sensor 53 is sent to the ECU 40.

As explained above, when the EHC 26 is supplied with power, the EHC 26 is heated. When the temperature of the EHC 26 exceeds the heat resistance temperature, the EHC 26 is liable to melt down and the exhaust purification performance of the EHC 26 is liable to fall. For this reason, there is a "consumable power" at the EHC 26 up to which the temperature of the EHC 26 does not exceed the heat resistance temperature.

The power consumption calculating part 41 calculates the power able to be consumed at the EHC 26 (below, simply referred to as the "consumable power"). The consumable power changes according to the temperature of the EHC 26. Specifically, the higher the temperature of the EHC 26, the smaller the consumable power becomes. For this reason, the power consumption calculating part 41 calculates the consumable power based on the temperature of the EHC 26 detected by the temperature sensor 53.

Further, the EHC 26 is heated not only by the supply of power, but also by exhaust gas. For this reason, the power consumption calculating part 41 may calculate the temperature of the EHC 26 based on the history of operation of the internal combustion engine 20 and the history of supply of power to the EHC 26. In this case, the temperature sensor 53 may be omitted from the hybrid vehicle 1.

In the present embodiment, the regenerative power generated by the second motor-generator 16 at the time of deceleration of the hybrid vehicle 1 is supplied to the EHC 26. The power supply control part 42 controls the supply of regenerative power to the EHC 26. Specifically, the power supply control part 42 selects the route of supply of the regenerative power to the EHC 26 and supplies the power to the EHC 26.

In the present embodiment, the power supply control part 42 selects as the route of supply of the regenerative power either a first route supplying the regenerative power to the EHC 26 without going through the battery 19 or a second route supplying the regenerative power to the EHC 26 through the battery 19. The power supply circuit 30 includes a circuit for selecting the first route or second route as the route of supply of the regenerative power. For this reason, the power supply control part 42 can control the power supply circuit 30 to thereby select the route of supply of the regenerative power.

Naturally, the charging efficiency of the battery 19 is less than 100%. That is, a part of the regenerative power supplied from the second motor-generator 16 to the battery 19 becomes power loss and is not stored in the battery 19. For this reason, if the second route is selected as the route of supply of regenerative power, compared with if the first route is selected as the route of supply of regenerative power, the power supplied to the EHC 26 becomes smaller.

Therefore, in the present embodiment, if the consumable power is equal to or more than a predetermined value, the power supply control part 42 supplies the regenerative power to the EHC 26 without going through the battery 19. That is, in this case, the power supply control part 42 selects the first route as the route for supply of the regenerative power. As a result, it is possible to efficiently supply the regenerative power to the EHC 26.

On the other hand, if the consumable power is less than a predetermined value, the power supply control part 42 supplies the regenerative power to the EHC 26 through the battery 19. That is, in this case, the power supply control part 42 selects the second route as the route for supply of the regenerative power. As a result, the regenerative power decreases by exactly the amount of the power loss, so the power supplied to the EHC 26 can be made smaller.

Due to the above control, even if the consumable power is small, it is possible to keep the temperature of the EHC 26 from exceeding the heat resistance temperature by supplying power to the EHC 26. For this reason, it is possible to suppress motoring by the regenerative power instead of supplying power to the EHC 26. Therefore, it is possible to suppress motoring at the time of regeneration.

<Processing for Supply of Power>

Below, referring to the flow chart of FIG. 3, control for supplying power to the EHC 26 will be explained in detail. FIG. 3 is a flow chart showing the control routine of processing for supplying power in the first embodiment of the present invention. The present control routine is repeatedly executed by the ECU 40 after the ignition switch of the hybrid vehicle 1 has been turned to ON.

First, at step S101, the power supply control part 42 judges whether deceleration of the hybrid vehicle 1 is requested. When the amount of operation of the accelerator pedal is made smaller by the driver, it is considered that deceleration of the hybrid vehicle 1 is requested. Further, when the brake pedal is operated by the driver as well, it is considered that deceleration of the hybrid vehicle 1 is requested. For this reason, the power supply control part 42 judges that deceleration of the hybrid vehicle 1 is requested when detecting that the amount of operation of the accelerator pedal has become smaller based on output of the position sensor 51 or when detecting that the brake pedal has been operated based on the output of the stroke sensor 52.

If at step S101 it is judged that deceleration of the hybrid vehicle 1 has not been requested, the present control routine ends. On the other hand, if at step S101 it is judged that deceleration of the hybrid vehicle 1 is requested, the present control routine proceeds to step S102.

At step S102, the power consumption calculating part 41 calculates the consumable power Pco based on the temperature of the EHC 26. The temperature of the EHC 26 is detected by the temperature sensor 53 or is calculated based on the history of operation of the internal combustion engine 20 and the history of supply of power to the EHC 26.

Next, at step S103, the power supply control part 42 judges whether the consumable power Pco is equal to or more than a predetermined value A. The predetermined value A is determined in advance based on the power loss due to the supply of power through the battery 19 etc. Note that, the predetermined value A may be calculated in accordance with the required deceleration etc. In this case, the required deceleration is for example estimated based on the output of the stroke sensor 52.

If at step S103 it is judged that the consumable power Pco is equal to or more than the predetermined value A, the present control routine proceeds to step S104. At step S104, the power supply control part 42 supplies the regenerative power to the EHC 26 without going through the battery 19. That is, the power supply control part 42 controls the power supply circuit 30 to select the first route as the route for supply of the regenerative power. After step S104, the present control routine ends.

On the other hand, if at step S103 it is judged that the consumable power Pco is less than the predetermined value A, the present control routine proceeds to step S105. At step S105, the power supply control part 42 supplies the regenerative power to the EHC 26 through the battery 19. That is, the power supply control part 42 controls the power supply circuit 30 to select the second route as the route for supply of the regenerative power. After step S105, the present control routine ends.

Note that, the generation of the regenerative power by the second motor-generator 16 may be performed just when the brake pedal is operated. In this case, at step S101, the power supply control part 42 judges that deceleration of the hybrid vehicle 1 is requested only when detecting based on the output of the stroke sensor 52 that the brake pedal has been operated. In this case, the position sensor 51 may be omitted from the hybrid vehicle 1.

Second Embodiment

The control device of a hybrid vehicle of a second embodiment is basically similar in configuration and control to the control device of a hybrid vehicle according to the first embodiment except for the points explained below. For this reason, below, the second embodiment of the present invention will be explained centered on the parts different from the first embodiment.

Figure 4:
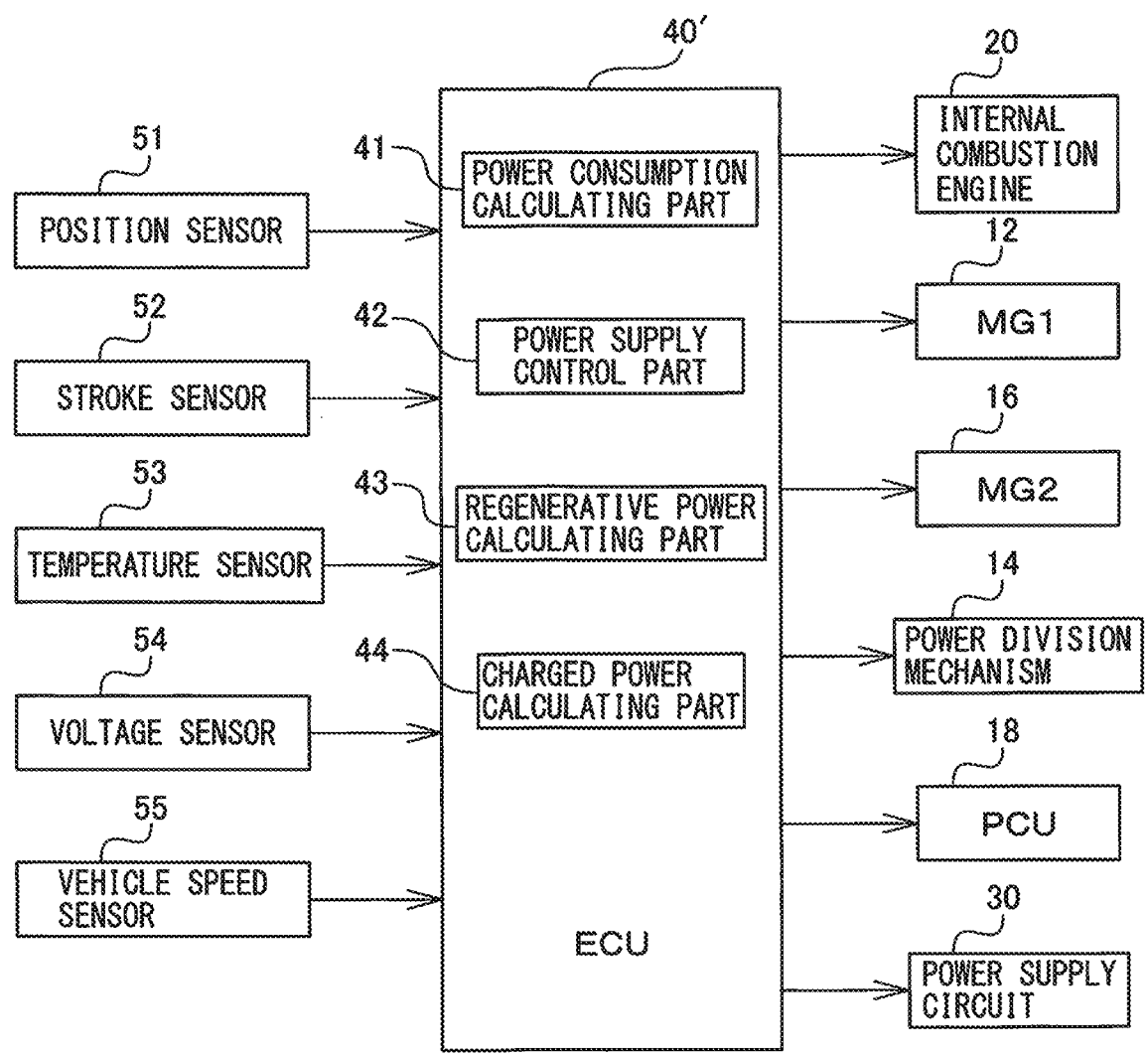
FIG. 4 is a block diagram schematically showing the configuration of a control device of a hybrid vehicle etc., according to a second embodiment of the present invention.

FIG. 4 is a block diagram schematically showing the configuration of a control device of a hybrid vehicle etc., according to the second embodiment of the present invention. In the second embodiment, the ECU 40' functions as a power consumption calculating part 41, power supply control part 42, regenerative power calculating part 43, and charged power calculating part 44. Further, in the present embodiment, outputs of a position sensor 51, stroke sensor 52, temperature sensor 53, voltage sensor 54, and vehicle speed sensor 55 are input to the ECU 40.

The voltage sensor 54 is provided at the battery 19 and detects the voltage across electrodes of the battery 19. The voltage sensor 54 is connected to the ECU 40. The output of the voltage sensor 54 is sent to the ECU 40.

The vehicle speed sensor 55 is provided at the hybrid vehicle 1 and detects the speed of the hybrid vehicle 1. The vehicle speed sensor 55 is connected to the ECU 40. The output of the vehicle speed sensor 55 is sent to the ECU 40.

When deceleration of the hybrid vehicle 1 is requested, the regenerative power calculating part 43 calculates a predicted value of the regenerative power generated by the second motor-generator 16. The regenerative power calculating part 43, for example, uses a map or calculation formula stored in the memory (for example ROM) of the ECU 40 to calculate the predicted value of the regenerative power based on the speed of the hybrid vehicle 1 and the amount of operation of the brake pedal.

Figure 5:
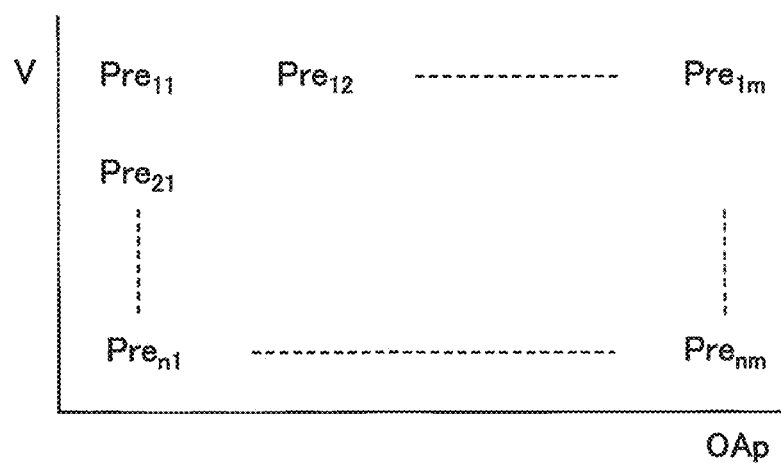
FIG. 5 is a map for calculating a predicted value of regenerative power.

The map or calculation formula is created so that the higher the speed of the hybrid vehicle 1, the larger the predicted value of the regenerative power becomes and so that the greater the amount of operation of the brake pedal, the larger the predicted value of the regenerative power becomes. If a map is used, as shown in FIG. 5, the predicted value Pre of the regenerative power is shown as a function of the speed V of the hybrid vehicle 1 and the amount of operation OAp of the brake pedal.

The charged power calculating part 44 calculates the power able to be charged in the battery 19 (below, simply referred to as the "chargeable power"). For example, the charged power calculating part 44 calculates the state of charge SOC of the battery 19 based on the output of the voltage sensor 54 etc., and calculates the chargeable power based on the state of charge SOC. In this case, the higher the state of charge SOC, the smaller the chargeable power.

If the predicted value of the regenerative power is larger than the chargeable power, the regenerative power has to be supplied elsewhere besides the battery 19 as well. For this reason, the power supply control part 42 performs the following control if the predicted value of the regenerative power is larger than the chargeable power.

If the consumable power is equal to or more than the predicted value of the regenerative power minus the chargeable power, the power supply control part 42 supplies the regenerative power to the EHC 26 without going through the battery 19. That is, in this case, the power supply control part 42 selects the first route as the route of supply of the regenerative power. As a result, it is possible to efficiently supply the regenerative power to the EHC 26.

Further, if the consumable power is equal to or more than the predicted value of the regenerative power minus the chargeable power and the power loss when the regenerative power is passed through the battery 19, the power supply control part 42 supplies the regenerative power to the EHC 26 through the battery 19. That is, in this case, the power supply control part 42 selects the second route as the route of supply of the regenerative power. As a result, even if supplying power to the EHC 26, it is possible to keep the supplied power from exceeding the consumable power.

Further, if the consumable power is less than the predicted value of the regenerative power minus the chargeable power and the power loss when going through the battery 19, the power supply control part 42 drives the internal combustion engine by the regenerative power without supplying the regenerative power to the EHC 26. That is, in this case, the power supply control part 42 performs motoring. Specifically, the power supply control part 42 controls the PCU 18 to supply the regenerative power generated by the second motor-generator 16 to the first motor-generator 12 and to drive the internal combustion engine 20 by the output torque of the first motor-generator 12 driven by the regenerative power. By doing this, it is possible to secure the braking force of the hybrid vehicle 1 by engine braking while keeping the EHC 26 from exceeding the heat resistance temperature.

Due to the above control, even if the consumable power is small, by reducing the regenerative power by exactly the amount of the power loss, it is possible to supply regenerative power to the EHC 26. For this reason, it is possible to suppress motoring by the regenerative power instead of supplying power to the EHC 26. Therefore, it is possible to suppress motoring at the time of regeneration.

<Processing for Supply of Power>

FIG. 6 is a flow chart showing a control routine of processing for supply of power in the second embodiment of the present invention. The present control routine is repeatedly executed by the ECU 40 after the ignition switch of the hybrid vehicle 1 is turned to ON.

Figure 3:
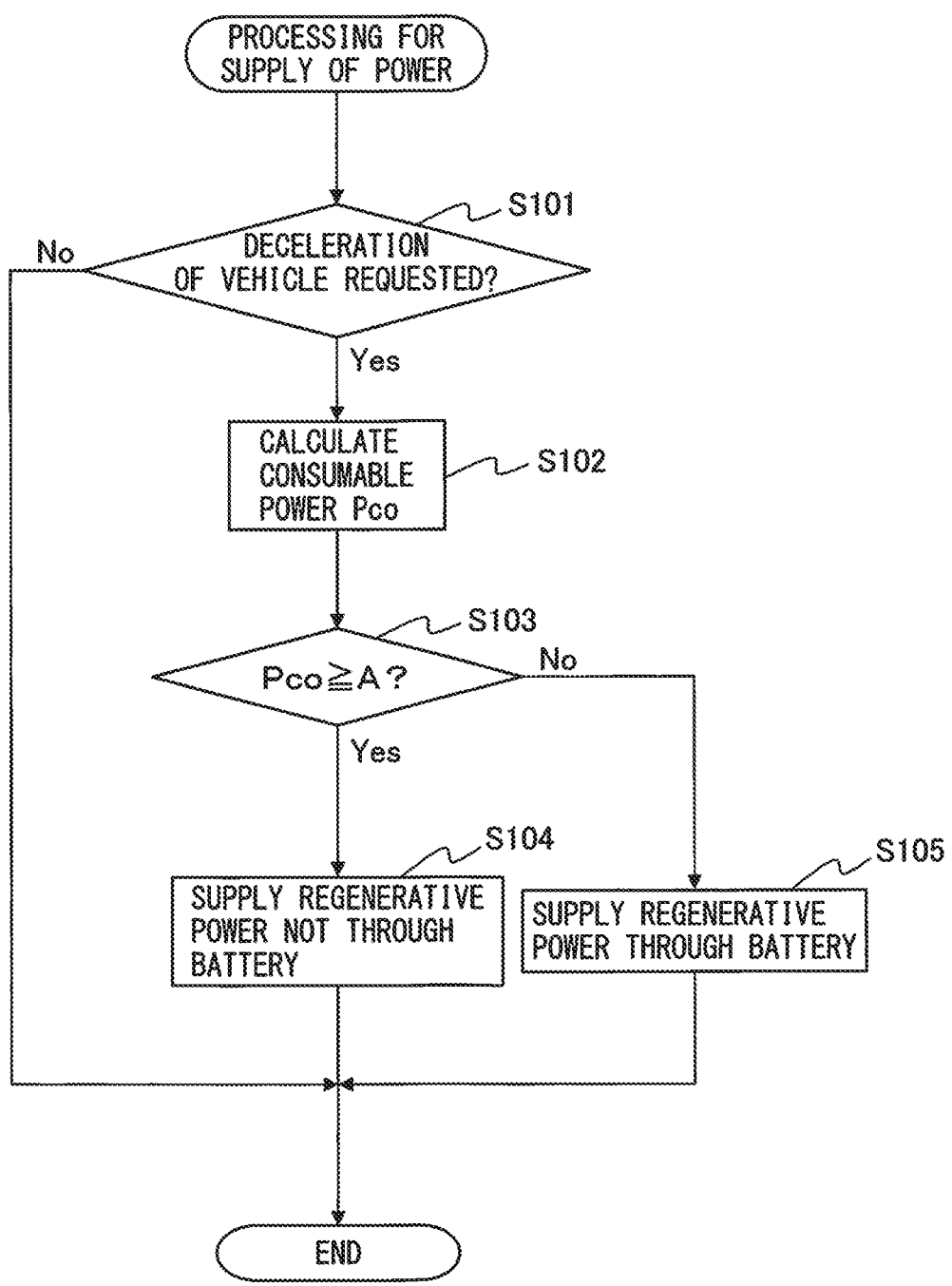
FIG. 3 is a flow chart showing a control routine of processing for supplying power in the first embodiment of the present invention.

First, at step S201, in the same way as step S101 of FIG. 3, the power supply control part 42 judges whether deceleration of the hybrid vehicle 1 is requested. If it is judged that deceleration of the hybrid vehicle 1 is not requested, the present control routine ends. On the other hand, if it is judged that deceleration of the hybrid vehicle 1 is requested, the present control routine proceeds to step S202.

At step S202, the regenerative power calculating part 43 calculates the predicted value Pre of the regenerative power generated by the second motor-generator 16. The regenerative power calculating part 43, for example, uses a map or a calculation formula stored in the memory (for example, ROM) of the ECU 40 and calculates the predicted value Pre of the regenerative power based on the speed of the hybrid vehicle 1 and the amount of operation of the brake pedal. The speed of the hybrid vehicle 1 is detected by the vehicle speed sensor 55, while the amount of operation of the brake pedal is detected by the stroke sensor 52.

Note that, the regenerative power calculating part 43 may use another known method to calculate the predicted value Pre of the regenerative power. For example, if a navigation system including a GPS receiver and map information is provided in the hybrid vehicle 1, the regenerative power calculating part 43 may calculate the predicted value Pre of the regenerative power by using the current positional information of the hybrid vehicle 1 acquired from the navigation system.

Next, at step S203, the charged power calculating part 44 calculates the state of charge SOC of the battery 19 based on the output of the voltage sensor 54 etc., and calculates the chargeable power Pch based on the state of charge SOC.

Next, at step S204, the power supply control part 42 judges whether the chargeable power Pch is equal to or more than the predicted value Pre of the regenerative power. If it is judged that the chargeable power Pch is equal to or more than the predicted value Pre of the regenerative power, the present control routine proceeds to step S205.

At step S205, the power supply control part 42 supplies the regenerative power to the battery 19. Note that, if a rise in temperature of the EHC 26 is requested, for example, if the temperature of the EHC 26 is equal to or less than a predetermined value, the power supply control part 42 may supply the regenerative power to the battery 19 and supply the regenerative power to the EHC 26 without going through the battery 19. After step S205, the present control routine ends.

On the other hand, if at step S204 it is judged that the predicted value Pre of the regenerative power is larger than the chargeable power Pch, the present control routine proceeds to step S206. At step S206, the power consumption calculating part 41 calculates the consumable power Pco based on the temperature of the EHC 26 in the same way as step S102 of FIG. 3.

Next, at step S207, the power supply control part 42 judges whether the consumable power Pco is equal to or more than the predicted value Pre of the regenerative power minus the chargeable power Pch. If it is judged that the consumable power Pco is equal to or more than the predicted value Pre of the regenerative power minus the chargeable power Pch, the present control routine proceeds to step S208.

At step S208, the power supply control part 42 supplies the regenerative power to the EHC 26 without going through the battery 19. That is, the power supply control part 42 controls the power supply circuit 30 to select the first route as the route for supply of the regenerative power. Note that if the chargeable power Pch is greater than zero, the power supply control part 42 directly supplies the regenerative power to the EHC 26 and supplies the regenerative power to the battery 19. After step S208, the present control routine ends.

On the other hand, if at step S207 it is judged that the consumable power Pco is less than the predicted value Pre of the regenerative power minus the chargeable power Pch, the present control routine proceeds to step S209. At step S209, the power supply control part 42 judges whether the consumable power Pco is equal to or more than the predicted value Pre of the regenerative power minus the chargeable power Pch and the power loss PL when the regenerative power is passed through the battery 19. The power loss PL is determined in advance. Note that, if the power loss PL fluctuates in accordance with a predetermined parameter (for example, the state of charge SOC of the battery 19 etc.), the power loss PL may be calculated based on the predetermined parameter.

If at step S209 it is judged that the consumable power Pco is equal to or more than the predicted value Pre of the regenerative power minus the chargeable power Pch and the power loss PL, the present control routine proceeds to step S210. At step S210, the power supply control part 42 supplies the regenerative power to the EHC 26 through the battery 19. That is, the power supply control part 42 controls the power supply circuit 30 to select the second route as the route of supply of the regenerative power. Note that, if the chargeable power Pch is larger than zero, the power supply control part 42 stores a part of the regenerative power supplied to the battery 19 in the battery 19. After step S210, the present control routine ends.

On the other hand, if at step S209 it is judged that the consumable power Pco is less than the predicted value Pre of the regenerative power minus the chargeable power Pch and the power loss PL, the present control routine proceeds to step S211. At step S211, the power supply control part 42 performs motoring. That is, the power supply control part 42 uses the regenerative power to drive the internal combustion engine without supplying the regenerative power to the EHC 26. Further, at this time, in addition to motoring, the regenerative power may be supplied to the EHC 26 through the battery 19 within a range where the power supplied to the EHC 26 does not exceed the consumable power Pco. After step S211, the present control routine ends.

Note that, if the power loss PL is extremely large etc., step S209 and step S211 may be omitted. In this case, if the consumable power Pco is less than the predicted value Pre of the regenerative power minus the chargeable power Pch, the power supply control part 42 supplies the EHC 26 with regenerative power through the battery 19.

Other Embodiments

Above, preferable embodiments according to the present invention were explained, but the present invention is not limited to these embodiments and can be corrected and changed in various ways within the language of the claims.

For example, instead of the power supply circuit 30, a PCU 18 may be used. In this case, the PCU 18 is also electrically connected to the EHC 26. If the first route is selected as the route for supply of the regenerative power, the PCU 18 supplies the regenerative power generated by the second motor-generator 16 directly to the EHC 26. On the other hand, if the second route is selected as the route for supply of regenerative power, the PCU 18 supplies the regenerative power generated by the second motor-generator 16 to the battery 19 and supplies the power stored in the battery 19 to the EHC 26.

Further, the hybrid vehicle 1 in the present embodiment is a so-called series/parallel type of hybrid vehicle. However, the hybrid vehicle 1 may be a so-called series type or parallel type of hybrid vehicle. Further, the hybrid vehicle 1 may be a plug-in hybrid vehicle able to charge the battery 19 from an outside power source.

The invention claimed is:

1. A control device of a hybrid vehicle for controlling a hybrid vehicle comprising an internal combustion engine in an exhaust passage of which an electric heating type catalyst is provided, a motor-generator, and a battery storing regenerative power generated by the motor-generator, comprising:
    a power consumption calculating part configured to calculate power able to be consumed in the electric heating type catalyst; and
    a power supply control part configured to select a route for supplying the regenerative power to the electric heating type catalyst and supply the regenerative power to the electric heating type catalyst, wherein
    the power supply control part is configured to supply the regenerative power to the electric heating type catalyst without going through the battery if the power able to be consumed in the electric heating type catalyst is equal to or more than a predetermined value, and supply the regenerative power to the electric heating type catalyst through the battery if the power able to be consumed in the electric heating type catalyst is less than the predetermined value.

2. The control device of a hybrid vehicle according to claim 1, further comprising:
    a regenerative power calculating part configured to calculate a predicted value of regenerative power generated by the motor-generator when deceleration of the hybrid vehicle is requested; and
    a charged power calculating part configured to calculate power able to be charged in the battery, wherein
    if the predicted value is larger than the power able to be charged in the battery, the power supply control part is configured to supply the regenerative power to the electric heating type catalyst without going through the battery if the power able to be consumed in the electric heating type catalyst is equal to or more than the predicted value minus the power able to be charged in the battery, and supply the regenerative power to the electric heating type catalyst through the battery if the power able to be consumed in the electric heating type catalyst is less than the predicted value minus the power able to be charged in the battery.

3. The control device of a hybrid vehicle according to claim 2, wherein
    if the power able to be consumed in the electric heating type catalyst is less than the predicted value minus the power able to be charged in the battery, the power supply control part is configured to
    supply the regenerative power to the electric heating type catalyst through the battery if the power able to be consumed in the electric heating type catalyst is equal to or more than the predicted value minus the power able to be charged in the battery and power loss, wherein the power loss is an amount of the regenerative power that would not be charged in the battery and become lost when the regenerative power is passed through the battery, and
    use the regenerative power to drive the internal combustion engine without supplying the regenerative power to the electric heating type catalyst if the power able to be consumed in the electric heating type catalyst is less than the predicted value minus the power able to be charged in the battery and the power loss.

* * * * *